(12) United States Patent
Jensen

(10) Patent No.: US 8,699,756 B2
(45) Date of Patent: Apr. 15, 2014

(54) GEODETIC MEASURING DEVICE

(75) Inventor: Thomas Jensen, Rorschach (CH)

(73) Assignee: Leica Geosystems AG, Heerbrugg (CH)

( * ) Notice: Subject to any disclaimer, the term of this patent is extended or adjusted under 35 U.S.C. 154(b) by 222 days.

(21) Appl. No.: 13/148,941

(22) PCT Filed: Feb. 10, 2010

(86) PCT No.: PCT/EP2010/051658
§ 371 (c)(1),
(2), (4) Date: Aug. 10, 2011

(87) PCT Pub. No.: WO2010/092087
PCT Pub. Date: Aug. 19, 2010

(65) Prior Publication Data
US 2012/0014564 A1    Jan. 19, 2012

(30) Foreign Application Priority Data
Feb. 11, 2009   (EP) .................................... 09152540

(51) Int. Cl.
*G06K 9/00*    (2006.01)
(52) U.S. Cl.
USPC .......................................................... 382/106
(58) Field of Classification Search
USPC .................... 382/100–107; 356/3–7
See application file for complete search history.

(56) References Cited

U.S. PATENT DOCUMENTS

| | | | |
|---|---|---|---|
| 6,411,371 B1 * | 6/2002 | Hinderling et al. | 356/4.01 |
| 6,504,602 B1 * | 1/2003 | Hinderling | 356/5.1 |
| 2003/0214732 A1 * | 11/2003 | Kajino et al. | 359/822 |
| 2006/0192946 A1 * | 8/2006 | Walser | 356/144 |
| 2008/0137980 A1 * | 6/2008 | Mizuno | 382/255 |
| 2008/0151090 A1 * | 6/2008 | Becker | 348/308 |

FOREIGN PATENT DOCUMENTS

| | | |
|---|---|---|
| CA | 2 519 431 A1 | 9/2004 |
| CN | 101197941 A | 6/2008 |
| CN | 101198839 A | 6/2008 |
| CN | 201378222 Y | 1/2010 |
| DE | 19710722 A1 | 10/1997 |
| DE | 19926706 A1 | 12/1999 |
| DE | 19949580 A1 | 4/2000 |

(Continued)

OTHER PUBLICATIONS

Chinese Search Report dated Oct. 29, 2012 as received in application No. 201080007299.3.

(Continued)

*Primary Examiner* — Atiba O Fitzpatrick
(74) *Attorney, Agent, or Firm* — Maschoff Brennan

(57) ABSTRACT

Geodetic measuring device that has an angle and distance measuring functionality for determining a position of a target object. For this purpose, the measuring device comprises a sighting device having a lens that magnifies multiplicatively, a camera sensor comprising a plurality of image recording points for recording a camera image of a field of view, a focusing optical system arranged in front of the camera sensor—wherein a first optical path is defined between the lens and the camera sensor—and an ocular. The camera sensor is connected to an electronic graphics processor for generating a display image from the camera image. The sighting device comprises an electronic graphical display component arranged in front of the ocular for visually presenting the generated display image, wherein a second optical path separated from the first optical path by the display image is defined between the display component and the ocular.

20 Claims, 7 Drawing Sheets

(56) References Cited

FOREIGN PATENT DOCUMENTS

| | | |
|---|---:|---|
| DE | 10235888 A1 | 2/2003 |
| DE | 102005005803 A1 | 8/2006 |
| EP | 1081459 A1 | 3/2001 |
| EP | 1610092 A1 | 12/2005 |
| EP | 1662278 A1 | 5/2006 |
| EP | 1686350 A1 | 8/2006 |
| EP | 1744195 A1 | 1/2007 |
| EP | 1744196 A1 | 1/2007 |
| JP | 2004-163197 A | 6/2004 |
| WO | 2007/107975 A1 | 9/2007 |
| WO | 2007107975 A1 | 9/2007 |

OTHER PUBLICATIONS

Chinese Office Action dated Nov. 7, 2012 as received in application No. 201080007299.3.

* cited by examiner

GEODETIC MEASURING DEVICE

FIELD OF THE INVENTION

The invention relates to a geodetic measuring device having an angle and distance measuring functionality for determining a position of a target object.

BACKGROUND

For measuring a target point, numerous geodetic measuring devices have been known since ancient times. In this case, distance and direction or angle from a measuring device to the target point to be measured are recorded and, in particular, the absolute position of the measuring device together with reference points possibly present are detected as spatial standard data.

Generally known examples of such geodetic measuring devices include the theodolite, tachymeter and total station, which is also designated as electronic tachymeter or computer tachymeter. One geodetic measuring device from the prior art is described in the publication document EP 1 686 350, for example. Such devices have electrical-sensor-based angle and distance measuring functions that permit direction and distance to be determined with respect to a selected target. In this case, the angle and distance variables are determined in the internal reference system of the device and, if appropriate, also have to be combined with an external reference system for absolute position determination.

Modern total stations have microprocessors for digital further processing and storage of detected measurement data. The devices generally have a compact and integrated design, wherein coaxial distance measuring elements and also computing, control and storage units are usually present in a device. Depending on the expansion stage of the total station, motorization of the targeting or sighting device and means for automatic target seeking and tracking can additionally be integrated. As a human-machine interface, the total station can have an electronic display control unit—generally a microprocessor computing unit with electronic data storage means—with display and input means, e.g. a keyboard. The measurement data detected in an electrical-sensor-based manner are fed to the display control unit, such that the position of the target point can be determined, optically displayed and stored by the display control unit. Total stations known from the prior art can furthermore have a radio data interface for setting up a radio link to external peripheral components such as e.g. a handheld data acquisition device, which can be designed, in particular, as a data logger or field computer.

For sighting or targeting the target point to be measured, geodetic measuring devices of the generic type have a telescopic sight such as e.g. an optical telescope, as sighting device. The telescopic sight is generally rotatable about a vertical axis and about a horizontal tilting axis relative to a base of the measuring device, such that the telescopic sight can be aligned with the point to be measured by pivoting and tilting. Modern devices can have, in addition to the optical viewing channel, a camera for detecting an image, said camera being integrated into the telescopic sight and being aligned for example coaxially or in a parallel fashion, wherein the detected image can be represented, in particular, as a live image on the display of the display control unit and/or on a display of the peripheral device—such as e.g. the data logger—used for remote control. In this case, the optical system of the sighting device can have a manual focus—for example an adjusting screw for altering the position of a focusing optical system—or an autofocus, wherein the focus position is altered e.g. by servomotors. Automatic focusing devices for telescopic sights of geodetic devices are known e.g. from DE 19710722, DE 19926706 or DE 19949580.

The optical system or the optical viewing channel of the sighting device usually contains an objective lens group, an image reversal system, a focusing optical system, a reticule for producing a cross hair and an eyepiece, which are arranged e.g. in this order from the object side. The position of the focusing lens group is set depending on the object distance in such a way that a sharp object image arises on the reticule arranged in the focusing plane. Said image can then be viewed through the eyepiece or e.g. detected with the aid of a camera arranged coaxially.

By way of example, the construction of generic telescopic sights of geodetic devices is disclosed in the publication documents EP 1 081 459 or EP 1 662 278.

On account of the beam path that is usually to be utilized jointly both as viewing channel and for measurements, such devices require the technical design of said beam path in the manner of construction of a telescope with specialized, high-precision optical systems that are to be produced with a high outlay. Furthermore, an additional separate transmitting and receiving channel and also an additional image plane for the wavelength of the distance measuring device are provided for the coaxial electronic distance measurement. Moreover, conventional measuring devices in the meantime have an automatic target tracking function (ATR: "Automatic Target Recognition"), for which a further separate ATR light source—e.g. multimode fiber output, which emits light having a wavelength of 850 nm—and also a specific ATR camera sensor are additionally integrated in the telescope, such that the telescope optical system has a high complexity with some ramified beam paths.

In order to avoid distortions, color casts or vignetting—that is to say a decrease in brightness in edge regions of the observable field of view—extremely stringent requirements are made of the individual optical components. Accordingly, optical units that are coated specifically and in a manner involving a high outlay are necessary for coupling individual wavelengths out and in, in which case, despite the coating, the visual band is intended to allow a representation exhibiting the highest possible color fidelity. Moreover, the high complexity of the telescope necessitates a high outlay for the required high-precision mounting and adjustment of the optical components.

To summarize, as a result of the optical components of the telescope being utilized jointly both for the direct viewing channel and for measurements, the requirements made of the optical components are very stringent, which—disadvantageously—necessitates a high outlay in the production, mounting and adjustment of the optical components.

In order to keep down the risk of a parallax error between the direct-vision image and the reticule producing the crosshair when the user looks into the eyepiece obliquely, the aperture of the exit pupil of the eyepiece is very small in the generic telescopic sights. By way of example, the aperture of the pupil has a diameter of just a few millimeters. This also proves to be disadvantageous, since viewing the target through the small pupil aperture is found to be strenuous by users and is suboptimal particularly for users who wear spectacles. This is because the field of view for the observer is already significantly restricted when looking into the eyepiece at a slight distance from the eyepiece.

In order to allow the user to experience more relaxed viewing of the target to be measured and an ergonomically expedient application of the measuring device, camera-screen combinations are often being used in the meantime. For this purpose, by way of example, a coaxial camera is additionally provided in the telescopic sight.

The camera image can be represented on the user display of the display control unit or on the display of a separate peripheral device (e.g. data logger), such that control of the measuring process and also target identification or target tracking and hence facilitation and automation of the measuring process can be effected.

However, the sighting of the target object by the user is usually still effected by means of viewing the target through the eyepiece of the telescopic sight, since the displayed display image of the display control unit or of the data logger may be insufficiently recognizable during use in practice—e.g. in the case of insolation.

Moreover, the camera present in addition to the direct viewing channel requires a further image plane provided in the telescope optical system for the camera and coupling-out of a partial light beam via a beam splitter, which further increases the complexity of the telescopic sight and reduces the brightness of the direct viewing channel image.

SUMMARY

One object of the invention is to provide an improved geodetic measuring device for determining the position of a target point to be measured. In particular, the intention in this case is to enable the target point to be sighted in a more convenient manner—for the user —, more specifically where the target point can be sighted in a manner that is ergonomically comfortable—and suitable also for wearers of spectacles—even during use in the field in sunshine.

A further object is to reduce the complexity of the telescope optical system and to make it possible to use fewer optical elements producible with a high outlay, and to mount/adjust the optical components in a manner involving a lower outlay, without in this case having to accept losses with regard to the quality of the image of the surroundings that can be viewed through the eyepiece of the sighting device.

A further object of the invention is to make it possible to use an eyepiece having a comparatively large pupil aperture, but without the risk of a parallax error between the image of the surroundings and the crosshair when looking into the eyepiece obliquely.

These objects are achieved by means of the realization of the characterizing features of the independent claims. Features that develop the invention in an alternative or advantageous manner can be gathered from the dependent patent claims.

The invention relates to a geodetic measuring device, designed as a theodolite or total station, having an angle and distance measuring functionality for determining a position of a target object. For this purpose, the measuring device has a sighting device that functions as a telescopic sight, comprising an objective having a multiply magnifying effect, a camera sensor for detecting a camera image of a field of view, a focusing optical system disposed upstream of the camera sensor, and also an eyepiece. In this case, a first optical path is defined between the objective and the camera sensor.

Furthermore, an electronic graphics processor for generating a display image from the detected camera image is present, said electronic graphics processor being connected to the camera sensor.

According to the invention, the sighting device in this case additionally has an electronic graphical display component more particularly a micro- or mini display—disposed upstream of the eyepiece and serving for the visual representation of the generated display image. In this case, a second optical path—separated from the first optical path—is defined between the display component and the eyepiece. In order to separate the optical paths, in the sighting device, in particular, a demarcation between the first and second optical paths that is opaque to optical rays in the visible range is provided in such a way that optical rays incident through the objective are prevented from entering into the eyepiece.

The invention thus breaks away from geodetic measuring devices of the prior art by completely dispensing with a visual direct viewing channel—necessitating optical systems to be produced with a high outlay and with stringent requirements—in the sighting device.

In order in this case, however, nevertheless to enable the target object to be sighted in sunshine—namely in the case where the display on an external display cannot be discerned well enough —, in the case of the measuring device according to the invention the electronic graphical display component is provided in the sighting device functioning as a telescopic sight, which component can be viewed through the eyepiece and thus replaces the visual direct viewing channel.

As already known in the case of geodetic measuring devices of the prior art, the sighting device, in a manner like a telescopic sight, is equipped with an objective as part of the telescopic sight optical system, but without a direct viewing channel.

According to the present invention, the camera image detected with the aid of the camera sensor is provided, in particular, as a live display image on the microdisplay wherein the electronic graphics processor generates the live display image from the camera image data preferably with real-time processing.

For this purpose, the display image data are transmitted from the graphics processor to the microdisplay connected thereto and are represented there visually as a display image—in particular a live display image. The display image can then be viewed by a user through the eyepiece—disposed downstream of the microdisplay.

As a technical effect according to the invention, the complexity of the optical system of the telescopic sight can be significantly reduced by the omission of the visual direct viewing channel, inter alia since no separate camera or direct viewing image planes are necessary and no separate camera branch with coupling-out of a partial beam with the aid of a beam splitter is required.

Moreover, optional electronic processing of the camera image makes it possible to use optical systems produced in a manner involving a lower outlay and meeting less stringent requirements, without the quality of the display image that can be viewed through the eyepiece being significantly reduced in this case by comparison with a direct viewing image. On the contrary, according to the invention, by virtue of suitable electronic processing of the detected camera image, a display image that is even improved relative to a direct viewing image with regard to many aspects can be provided and viewed on the microdisplay through the eyepiece, despite the use of lower-quality optical systems. By way of example, a distortion, a color cast caused by the coating of the optical systems, and/or vignetting can be reduced, compensated for or even entirely corrected with the aid of corresponding software-based image processing measures known per se—in particular in real time.

The same applies to the precision when mounting and adjusting the telescope optical systems. Thus, according to the invention, slight errors in the image of the surroundings that can be viewed in the eyepiece, which are caused, for instance, by optical elements positioned imprecisely in the telescope optical system, can be corrected or compensated for with the aid of corresponding electronic processing of the detected camera image. This allows the telescope optical systems to be mounted/adjusted with a lower outlay or in a manner complying with less stringent requirements, without the quality of the display image that can be viewed being significantly adversely affected in this case.

Moreover, according to the invention, it is possible to dispense with the image reversal optical system, e.g. image reversal prism, required in the case of telescopic sights having a direct viewing channel, and to dispense with a reticule for producing the crosshair by virtue of corresponding electronic processing of the detected camera image, such that the complexity of the sighting device can furthermore be reduced as a result. By way of example, a crosshair—optionally together with further information concerning the measurement—can be inserted electronically directly into the display image.

As a result of such electronic addition of a crosshair when generating the display image in the graphics processor, in this case the further advantage over telescopic sights having a direct viewing channel is additionally afforded that an eyepiece having a comparatively large pupil aperture diameter can be used. As already described, by contrast, in the case of a visual direct viewing channel with reticule, the aperture of the exit pupil of the eyepiece has to be chosen to be very small e.g. having a diameter of just a few millimeters, in particular less than approximately 5 mm, in order to keep down a parallax error between reticule and intermediate image when a user looks into the eyepiece obliquely. This problem is caused by the superimposition of a virtual image plane, namely the intermediate image plane of the image of the surroundings, with a real image plane, namely the reticule.

By contrast, the invention—without increasing the risk of such a parallax error—permits the use of an eyepiece having a comparatively large pupil aperture, since an image of the field of view region together with the crosshair is generated jointly in one plane, namely in particular the plane of the screen of the microdisplay. By way of example, the eyepiece can accordingly have a pupil aperture having a diameter of between 5 and 20 mm. This affords the advantage that a small exit pupil having a disturbing effect is not necessary in the eyepiece and the user can sight the target object through the eyepiece with greater convenience and in a more relaxed fashion. Moreover, as a result, the viewing of the display image through the eyepiece is suitable in an improved manner also for users who wear spectacles.

Furthermore, the electronic insertion of the crosshair makes it possible to provide selectability from possible predetermined crosshair embodiments, in particular in such a way that the choice of a crosshair embodiment can be made in an application-specific manner. By way of example, a selection from crosshairs that differ with regard to the color and/or form can be made available to the user. For some applications, by way of example, concentric circles or a grid for indexing the sighted target point in the display image may prove to be advantageous. In order to clearly discern the crosshair in the display image even under dark lighting conditions, e.g. at dusk, the crosshair can be chosen in a white color, for example.

With regard to the outlay when mounting and adjusting the sighting device, advantages are additionally afforded by virtue of the fact that a—compared with the required positioning accuracy of a reticule in the case of telescopic sights of the prior art—considerably lower lateral positioning accuracy of the camera sensor relative to the optical axis of the sighting device is sufficient. This is because, since the image detection point of the camera sensor that corresponds to the optical axis can be determined by means of a simple calibration, the crosshair can be inserted by software with its center exactly at the position linked to said image detection point in the display image and the target object can thus be sighted with high precision.

In this case, the high-precision positioning of the reticule as required for direct viewing channels, said positioning therefore involving a high outlay, can be entirely omitted according to the invention.

The installation position of the microdisplay as graphical display component is also noncritical with regard to the sighting accuracy provided and is independent, in principle, of the optical axis of the sighting device or of the objective. In order to enable intuitive sighting or to facilitate the sighting, however, the optical axes of the objective and of the eyepiece—and also, in particular of the microdisplay—can preferably be aligned coaxially.

A further advantage can be brought about according to the invention with regard to the movement of the focusing element—disposed upstream of the camera sensor —, wherein the movement can be effected manually or automatically in a known manner. Specifically, if the mechanism during the movement of the focusing element has reproducing sequence errors which lead, for example, to a lateral displacement of the image position on the camera sensor, this can be corrected by software during the generation of the display image from the detected camera image by means of the graphics processor in a manner dependent on the respective current focus position.

Despite an actually considerable absolute error in the mechanism—such as, for example, flexure in the focusing optical system guidance—according to the invention it is thus possible to ensure high-precision sighting by means of software-based compensation of the error in the display image.

As an alternative to this, for some applications it may also suffice to adapt the position of a crosshair, which is supplemented into the display image by software—e.g. by means of electronic image processing—correspondingly in a manner dependent on the sequence error, such that the latter is corrected, and, consequently, nevertheless to make it possible for the user to carry out high-precision targeting that is substantially decoupled from the sequence error.

In addition or as an alternative to a seauence error correction, errors caused by temperature fluctuations in the telescope optical system—that is to say errors in the imaging on the camera that arise in a manner dependent on the temperature behavior of the telescope optical system—can also be compensated for by software during the generation of the display image from the detected camera image by means of the graphics processor. For this purpose, by way of example, it is possible to provide a temperature sensor in the sighting device, such that the temperature effects described can be removed by calibration.

In a further embodiment of the invention, the sighting device optical system has a highly distorting optical component, which alters the imaging scale from the central region of the field of view toward edge regions. By way of example, it is possible to use an optical component, in particular one having a fish-eye-like effect, of such a type that an additional magnification is produced in a central region of the field of view and, by contrast, a demagnification is produced in the edge regions of the field of view. As a result, it is possible, on the one hand, to ensure a large field of view and, on the other hand, nevertheless to permit an even increased resolution in the central region. This high degree of distortion produced in a targeted manner can be compensated for by software, such that an undistorted display image is generated again. In this case, the distorting optical system has the advantage that the central region of interest in the field of view can be detected with an increased resolution by the camera sensor and, consequently, a high image quality can be made possible even in the case of a digitally considerably magnified representation of a central region of the detected camera image as display image. By contrast, such a highly distorting optical system is unsuitable for direct visual viewing through a direct viewing channel—in accordance with the prior art.

Since the telescope optical system in measuring devices of the prior art generally has a field of view of approximately 1.5°, the process of finding the target object can prove to be lengthy. In order to ensure a larger field of view—of e.g. 15°—particularly at the beginning of the finding process, according to the invention it is possible to provide a specific additional optical element (e.g. a wide-angle optical system) which can optionally be pivoted into and out of the first optical path. In part, this effect can also be produced by the highly distorting, fish-eye-like optical system already mentioned. Additionally or alternatively, moreover, a further separate overview camera, aligned for example parallel to the optical axis of the sighting device optical system and arranged on the sighting device housing, could be used. The wide-angle image detected by said camera with a large field of view can be represented as a display image on the microdisplay (e.g. at the beginning of a finding process). After the target object has been found, the observer can change to the image of the integrated, coaxial camera sensor for targeting purposes. In this way—with continuous viewing of the same microdisplay through the eyepiece—a target object can both be found in a simple manner and be sighted precisely.

In this case, the camera sensor integrated in the sighting device optical system contains a multiplicity of image detection points. Purely by way of example, for instance, it is possible to use a camera sensor having five million image detection points, which can each have a pixel size of e.g. approximately 2 μm×2 μm. The camera sensor can be embodied as a CCD or CMOS area sensor, wherein the diagonal of the detection area can be between 5 and 10 mm, for example. In particular, the camera sensor is positioned in an intermediate image plane, in which the reticle is generally arranged in the case of direct viewing channel telescopic sights of the prior art.

By way of example, the camera sensor can be embodied and arranged in the sighting device in such a way that a camera image of a field of view of e.g. approximately 2.2°× 1.6° can be detected as standard. For comparison, a circular field of view of approximately 1.5° is customary in the case of generic direct viewing channel telescopic sights of the prior art.

Furthermore, the measuring device according to the invention—in one specific embodiment—can have an automatic fine targeting function (ATR: "Automatic Target Recognition") already known from the prior art. For this purpose, a fine targeting light source is provided, the emitted rays from which are coupled into the first optical path and emitted through the objective in the direction of the coarsely targeted target object. The fine targeting rays reflected at the target object can be received via the objective and—for example with the aid of a wavelength-dependent ray coupling-out element or filter—be directed onto a fine targeting detector.

According to the invention, however, the camera sensor present anyway can also perform the function of the fine targeting detector, such that the reflected fine targeting rays are detected as a fine targeting image by the camera sensor and are evaluated with regard to a fine alignment of the sighting device. In order to filter the received fine targeting rays reflected at the target object from the ambient light incident through the objective, a narrowband filter element that pivots in during the automatic fine targeting can be disposed upstream of the camera sensor, such that substantially only the fine targeting rays reflected at the target object are detected as a fine targeting image.

Conventionally, camera sensors have a certain wavelength range—e.g. around approximately 850 nm—in which the image detection points provided for the different colors have substantially the same sensitivity. This wavelength range is particularly well suited to the fine targeting function, that is to say that the fine targeting light source preferably emits fine targeting rays in this wavelength range—e.g. around approximately 850 nm.

Alternatively, it is also possible to use a camera sensor which has an additional pixel type specifically designed for the wavelength of the fine targeting rays (e.g. in the infrared range).

The electronic graphical display component is embodied—as already described—in particular as a microdisplay. In this case, the microdisplay can have e.g. a display diagonal of approximately between 5 and 25 mm. Corresponding microdisplays or mini displays, such as e.g.
an organic light-emitting diode display (OLED display),
a thin-film transistor liquid crystal display (TFT LED), or
a liquid crystal on silicon display (LCOS display),
are known from the prior art.

Since customary microdisplays generally have a lower resolution than conventional camera sensors, the camera image detected with high resolution can be compressed, that is to say that data reduction is effected during the generation of the display image. By way of example, conventional microdisplays have a resolution of, for example, 640×480 or 800×600 pixels and conventional camera sensors have e.g. a resolution of 2500×1900 image detection points. In the case of an entire representation of the detected camera image in the display image, therefore, a combination of the camera pixels of e.g. 3×3 pixels can advantageously be effected, such that it is thereby possible to obtain a considerable data reduction and hence a live image representation improved with regard to the reaction speed in the microdisplay. In the case of digital zooming in the display image, according to the above example, a 1 to 1 representation of the camera pixels to display pixels can be effected up to a factor of the electronic zoom of three without loss in the image quality, that is to say without required interpolation.

As already indicated above, the graphics processor, when generating the display image from the camera image, can carry out, inter alia, the following electronic processing steps—in particular substantially in real time:
electronic insertion of a line pattern and/or of a crosshair,
electronic insertion of measurement information,
compensation of a distortion of the camera image,
compensation of a decrease in brightness in edge regions of the camera image, and/or
compensation of a color cast of the camera image, said color cast being produced by the coating of an optical system situated in the first optical path, more particularly a white balance.

In this case, the graphics processor can be embodied—in a manner known per se—e.g. as an FPGA (Field Programmable Gate Array), PLD (Programmable Logic Device) or ASIC (Application-Specific Integrated Circuit). Alternatively, however, the graphics processing can also be effected by a central processing unit of the geodetic device—said unit therefore also functioning as a graphics processor—wherein various further electronic processing steps are additionally carried out by the central processing unit.

In a further specific embodiment, the detected camera image can additionally be used as a focusing aid for an autofocus or for manual focusing.

As already mentioned above in part, according to the invention e.g. the following applications/functions can additionally be provided in the display image of the microdisplay:

Representation of measured target points (measurement data), wherein the measurement data can correspondingly be superimposed with the live display image, such that the user is informed about which target points have already been measured and this can serve, for instance, as a decision basis for further measurements.

Representation of stored design data such as, for instance, a CAD model of a building to be constructed, wherein the design data can correspondingly be superimposed with the live display image and also e.g. optionally inserted and masked out. According to the invention, therefore, the user can at any time gain an overview of the design data, without removing the eye from the telescope in the process. In particular, the representation (e.g. the color used) of the design data can in this case be changed as soon as the design data have been transferred in the context of demarcation into the field, such that the demarcation progress is evident to the viewer in an improved fashion and the user has knowledge of which points have already been demarcated, and which have not.

Representation of measurement/design data in a manner dependent on the current position and alignment of the camera and, in particular, also in a manner dependent on the current zoom level, such that the measurement/design data are adapted according to the field of view currently represented in each case.

Distance-dependent representation of objects (in particular measurement points), such that near objects are represented as larger than objects further away, and an optical distance estimation of the recorded object is thereby made possible for the user.

Display of distance and angle indications of the current position of the target point (e.g. of the prism) relative to the desired position. The so-called demarcating elements can be displayed in the display. By way of example, arrows can be represented during a demarcating process for indicating the direction of the target point (prism) with respect to the desired position to be demarcated. Alternatively, it is also possible to simultaneously represent the crosshair and the desired position of the crosshair during demarcation, such that the user only has to bring the crosshair and the displayed desired position to correspondence by rotating the alidade. This enables the user to carry out the complete demarcating process for design data directly by viewing the microdisplay in the sighting device. Removing the eye from the eyepiece and refocusing necessary as a result of that (which can lead to eye fatigue) can thus be avoided. In accordance with the prior art, by contrast, targeting through the telescope is necessary and afterward the demarcation information respectively has to be read on the separate display, which necessitates constantly changing between a view through the telescopic sight and viewing the separate display.

Digital zooming in the live display image of the microdisplay, such that a larger representation of an object and, consequently, simplified and more accurate targeting can be provided for the user.

Insertion of additional information in the live display image of the microdisplay, said information being required for the measurement process, such as alphanumeric information (e.g. measurement elements such as distances or directions, point information, codes, prism types, etc.) or graphical information (e.g. a spirit level, battery status, prism types, etc.).

Display of different types of crosshairs, wherein, alongside the color of the crosshair, e.g. the form of the crosshair can also be selectable by the user. Depending on the application, the optimum crosshair therefor can thus be selected.

Change/manipulation of image brightness and contrast of the live display image of the microdisplay, as a result of which, for example when working against the light, the target point can be made visible in an improved fashion and fatigue-free working is thus made possible. By way of example, in sunshine, the brightness and/or the exposure time of the camera can be correspondingly changed.

Compensation/correction of image aberrations (distortions or color aberrations) in the live display image of the microdisplay, such that it is possible to provide optimum image properties and precise targetability for the user.

Implementation of diverse image processing procedures (e.g. sharpening an edge image or extracting an edge image. Consequently, the user can be provided with data filtered by a first image processing procedure and relevant to the working process.

BRIEF DESCRIPTION OF THE DRAWINGS

The method according to the invention and the device according to the invention are described in greater detail below purely by way of example on the basis of concrete exemplary embodiments illustrated schematically in the drawings, further advantages of the invention also being discussed. In the figures, specifically.

DETAILED DESCRIPTION

Figure 1:
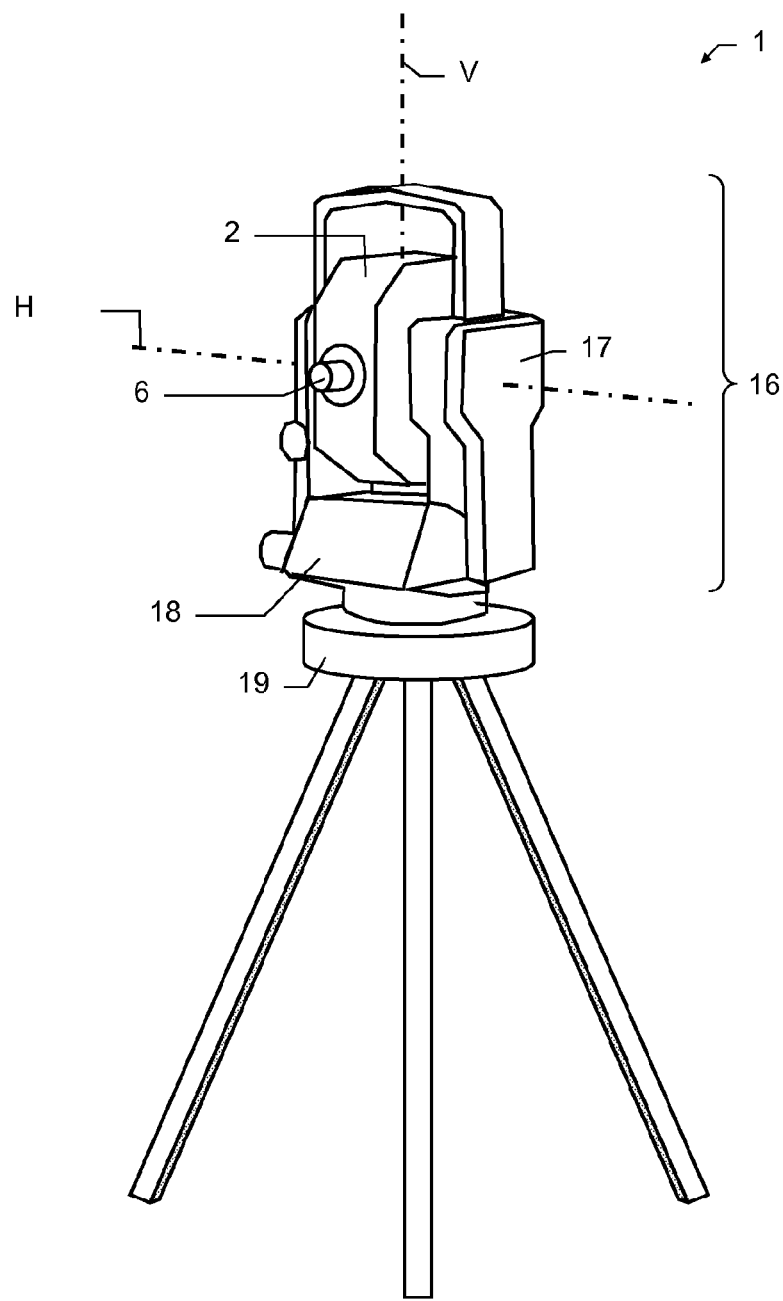
FIG. 1 shows a geodetic measuring device according to the invention, designed as a total station.

FIG. 1 shows a geodetic measuring device 1 according to the invention, designed as a total station, for measuring horizontal angles, vertical angles and distances with respect to a target object situated at a distance.

The total station is arranged on a stand, wherein a base 19 of the total station is directly and fixedly connected to the stand. The main body of the total station, said main body also being designated as upper part 16, is rotatable about a vertical axis V relative to the base 19.

In this case, the upper part 16 has a support 17—formed e.g. by two columns, a sighting device 2, which is mounted in a manner rotatable about the horizontal tilting axis H between the columns, and also an electronic display control unit 18. The display control unit 18 can be designed in a known manner for controlling the measuring device 1 and also for processing, displaying and storing measurement data.

The sighting device 2 is arranged on the support 17 in a manner rotatable about a horizontal tilting axis H and can therefore be horizontally and vertically pivoted and tilted relative to the base 19 for the purpose of alignment with a target object. In this case, the sighting device is embodied as a common sighting device structural unit, wherein at least one objective, a focusing optical system, a coaxial camera sensor, the mini display component according to the invention, the eyepiece 6 and also, in particular, a graphics processor are integrated in a common sighting device housing.

By means of the sighting device 2, the target object can be targeted and the distance from the total station to the target object can be detected in an electrical-sensor-based manner. Furthermore, means for the electrical sensor-based detection of the angular alignment of the upper part 16 relative to the base 19 and of the sighting device 2 relative to the support 17 are provided. These measurement data detected in an electrical-sensor-based manner are fed to the display control unit 18 are processed by the latter, such that the position of the target point relative to the total station can be determined, optically displayed and stored by the display control unit 18.

Figure 2:
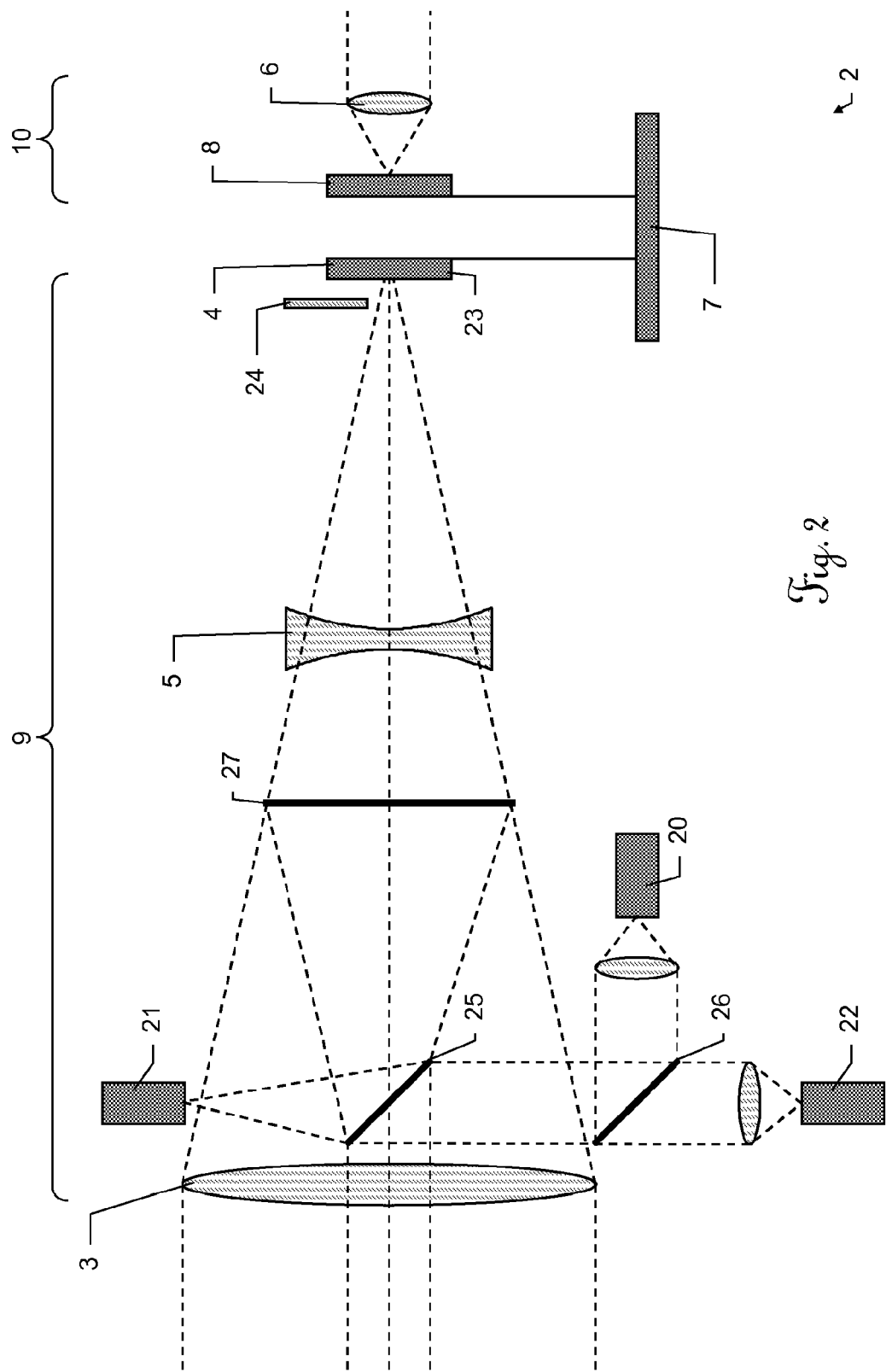
FIG. 2 shows a first embodiment for a sighting device optical device according to the invention with a microdisplay disposed upstream of the eyepiece.

FIG. 2 shows a first, refractive embodiment for a sighting device optical system according to the invention with a micro- or mini display as display component 8.

The sighting device optical system has the objective 3, the focusing optical system 5, a camera sensor 4—aligned coaxially with respect to the optical axis of the sighting device 2—for detecting a camera image, the microdisplay as display component 8, and also an eyepiece 6.

In this case, a camera sensor 4 is connected to an electronic graphics processor 7 for generating a display image from the detected camera image. Graphics processor 7 is in turn connected to the microdisplay, such that the generated display image can be represented with the aid of the microdisplay and the observed by a user through the eyepiece 6.

In this case, a first optical path 9 is defined between the objective 3 and the camera sensor 4 and a second optical path 10—separated from the first optical path 9 by the display image—is defined between the display component 8 and the eyepiece 6. In order to separate the optical paths—that is to say such that a direct view is blocked—in the sighting device, a demarcation between the first and second optical paths 9, 10 that is opaque to optical rays in the visible range is present in such a way that optical rays incident through the objective 3 are prevented from entering into the eyepiece 6. The demarcation is effected here by the camera sensor 4 or the microdisplay.

The objective 3 can e.g. also be constructed in multilens fashion or be embodied in panfocal fashion—with a variable field of view.

An EDM laser source 20 and a fine targeting light source 22 are respectively provided for the distance measurement and the automatic target seeking function, wherein the EDM laser beams and the fine targeting beams are correspondingly coupled in and out with the aid of a first and second beam combiner 25, 26—such as, for example, beam splitter surfaces with a dichroic coating. The EDM laser source 20 can emit e.g. EDM laser beams in the visual range—for instance having a range of 630 nm —, such that a measurement point is visible on the target object.

In this case, between the first beam combiner 25 and the focusing optical system 5, beam coupling-out unit 27 can be present, which couples out the EDM laser beams, but advantageously transmits the visual spectrum as far as possible in an unimpeded manner. The coupled-out EDM laser beams are directed onto an EDM receiver 21 by the beam combiner 25.

In the embodiment shown, the camera sensor 4 additionally serves as a fine targeting detector 23 (ATR receiver) for detecting reflected fine targeting rays.

The focusing element 5, the position of which is variable, can alternatively also be embodied in multilens fashion. The focusing element 5 advantageously has a stable, precisely reproducible position for objects at infinity, such that an achievable accuracy that is as good as possible can be ensured during the automatic fine targeting.

A narrowband filter 24 that can be pivoted in for the automatic fine targeting measurement can be provided upstream of the camera sensor, said filter blocking the ambient light and being designed to be transmissive for the wavelength of the fine targeting rays.

Figure 3:
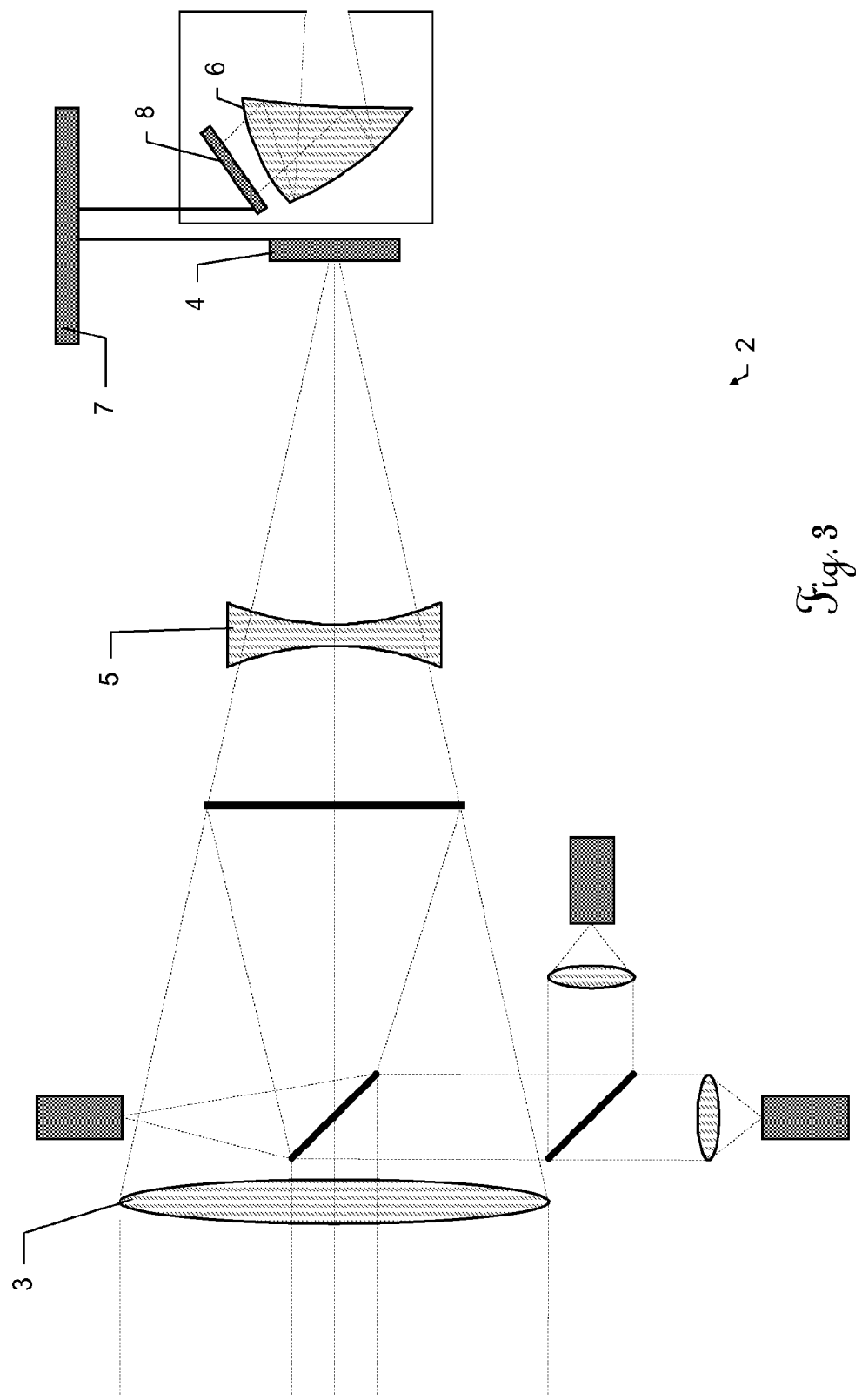
FIG. 3 shows a second embodiment for a sighting device optical device according to the invention with a microdisplay disposed upstream of the eyepiece.

FIG. 3 shows a second embodiment for a sighting device optical system according to the invention with a construction similar to that in FIG. 2.

Thus, the sighting device 2 illustrated schematically here also has an objective 3, a focusing optical system 5, a camera sensor 4—aligned coaxially with respect to the optical axis of the sighting device 2—and also a mini display component 8—embodied as an OLED microdisplay having a resolution of e.g. 800×600 display pixels—with an eyepiece 6.

In this case, however, the microdisplay is embodied together with the eyepiece 6 as an integrated structural unit, wherein the normal to the surface of the display screen is oriented obliquely with respect to the optical axis of the eyepiece 6 and of the objective 3.

Figure 4:
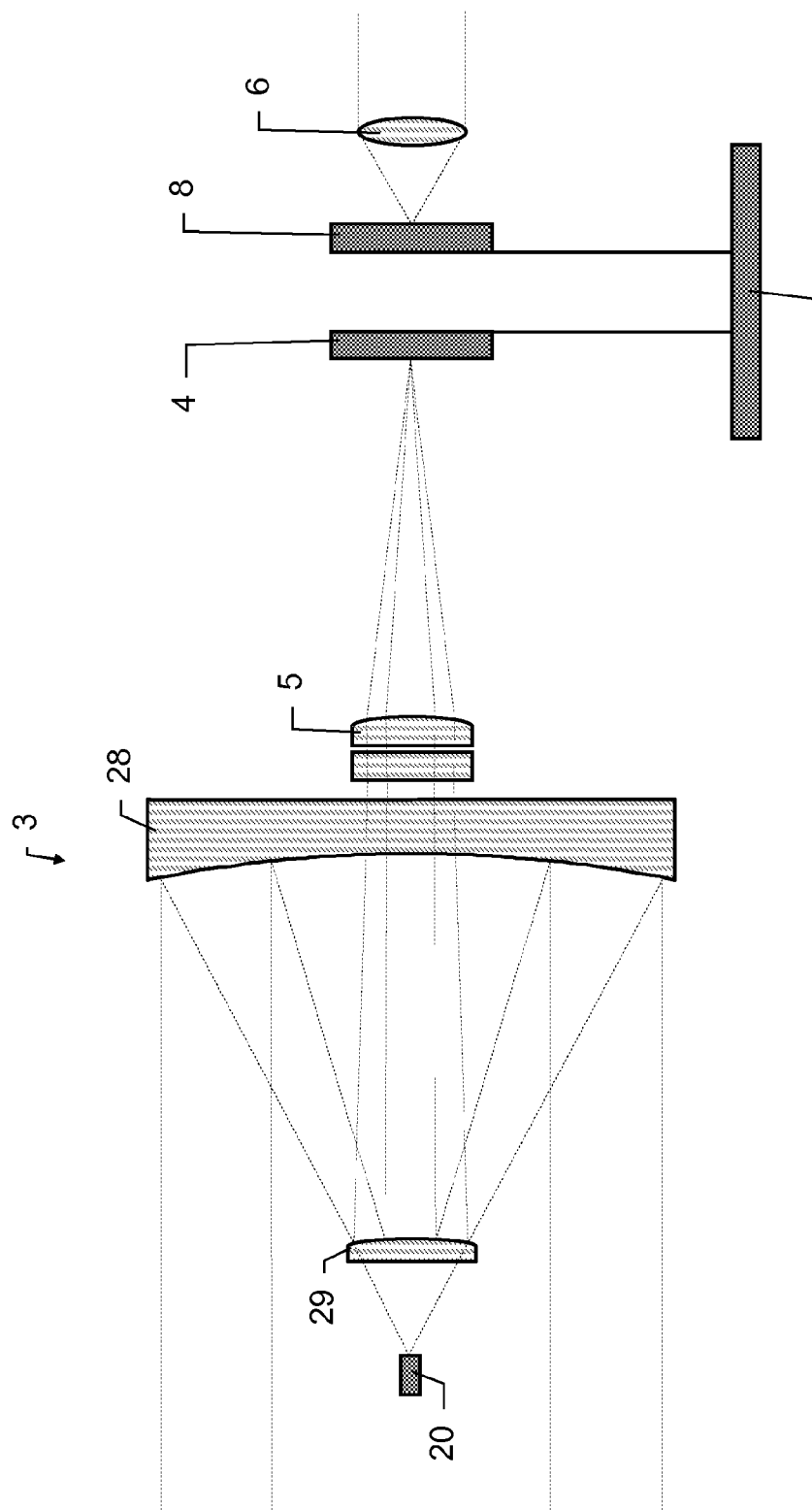
FIG. 4 shows a third embodiment for a sighting device optical device according to the invention with a microdisplay disposed upstream of the eyepiece.

FIG. 4 shows a third embodiment for a sighting device optical system according to the invention. In this case, the sighting device is embodied as a catadioptric system with mirror optical system. In this case, a first, concave mirror 28 serves as an objective 3.

A second, smaller mirror 29 is designed to be transmissive for EDM laser beams, such that the EDM laser beams emitted with the aid of the EDM laser source 20 for the distance measurement are transmitted through the second mirror 29.

With the aid of the multilens focusing optical system 5, an image of the field of view region is focused onto the camera sensor 4 and detected as a camera image. A display image can in turn be generated from the detected camera image by means of an electronic graphics processor 7, which display image can be represented with the aid of the mini display component 8 and be observed by a user through the eyepiece 6.

Figure 5:
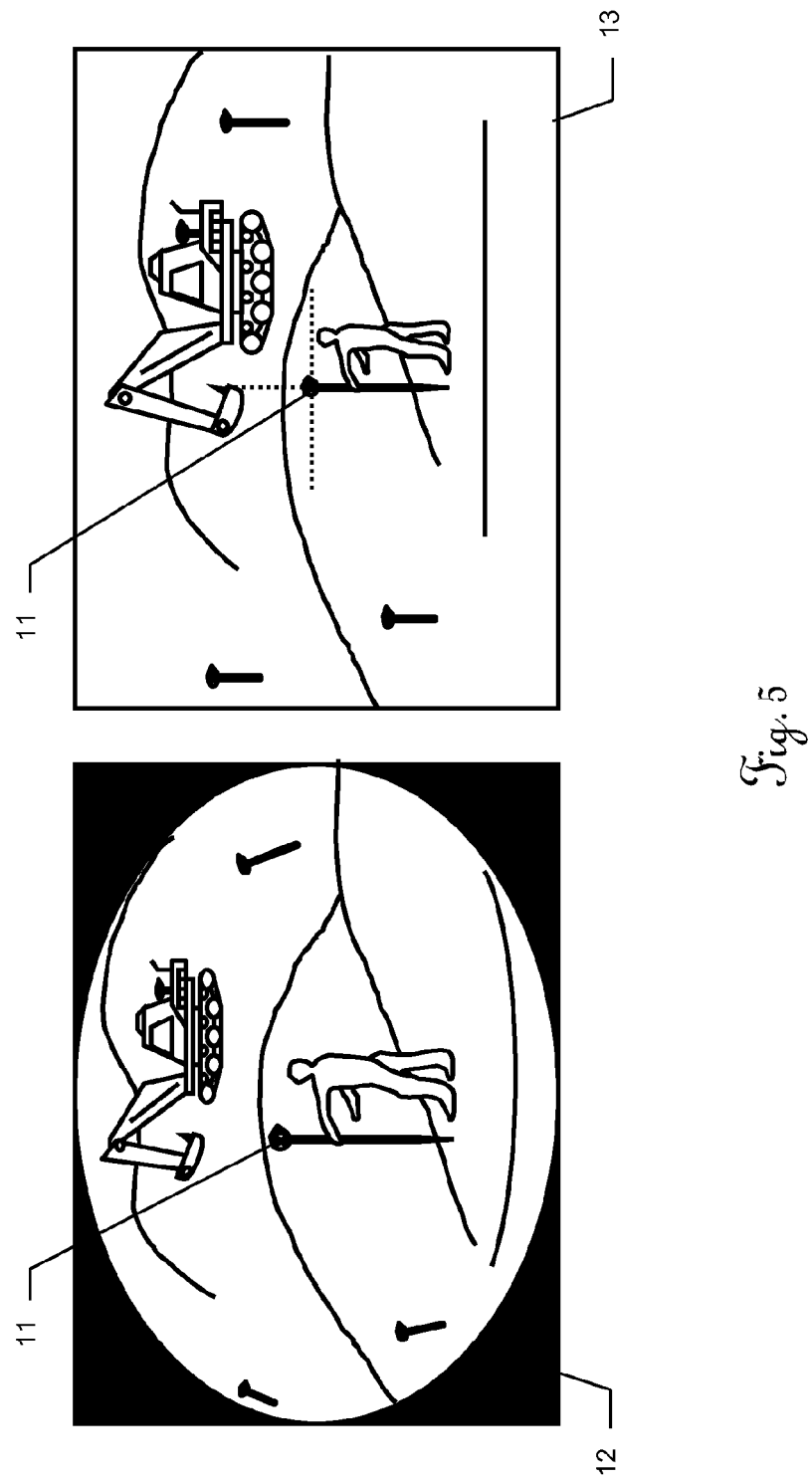
FIG. 5 shows a detected camera image and the display image of the microdisplay generated therefrom with the aid of the graphics processor.

FIG. 5 shows a detected camera image 12 and the display image 13 generated therefrom with the aid of the graphics processor for graphical representation on the microdisplay.

As can be discerned on the basis of the camera image 12, the sighting device optical system has a highly distorting optical component, such that the imaging scale is altered from the central region of the field of view toward edge regions. In particular, it is possible to use an optical component having a fish-eye-like effect of such a type that an additional magnification is produced in a central region of the field of view and, by contrast, a demagnification is produced in the edge regions of the field of view.

By means of the distorting optical system, therefore, the central region—used for the exact targeting of the target object 11—of the field of view can be detected with increased resolution relative to the edge regions of the field of view by means of the camera sensor. To summarize, therefore, it is possible, on the one hand, both to ensure a wider field of view—in comparison with a solution without a distorting optical system—and, on the other hand, nevertheless to allow a resolution that is even increased—in comparison to the solution without a distorting optical system—in the central region.

The known distortion—generated in a targeted manner—of the camera image 12 can be compensated for during the generation of the display image with the aid of electronic image processing, such that a display image 13 that is undistorted again is generated.

By virtue of the increased resolution ensured in the central region of interest in the field of view, it is then possible, even in the case of a digitally considerably magnified representation of the central region, to provide the detected camera image 12 as a display image 13 in the microdisplay in particular without losses in quality.

As a further electronic image processing step, during the generation of the display image 13 from the camera image 12, a crosshair is inserted at that location of the display image 13, such that the midpoint of the crosshair highly precisely indicates the current alignment of the optical axis of the sighting device.

As already explained, a digital zoom function can optionally be provided, such that in each case only a variable partial region of the camera image is represented in a correspondingly magnified fashion as a display image.

Furthermore, the camera image can be superimposed by software only with a crosshair, but additionally with other kinds of information. By way of example, an electronic addition of measurement data—in particular angle/distance values, GIS data, design data and/or markings for points that have already been measured—can be effected, such that these can likewise be gathered from the display image represented in the microdisplay.

Figure 6:
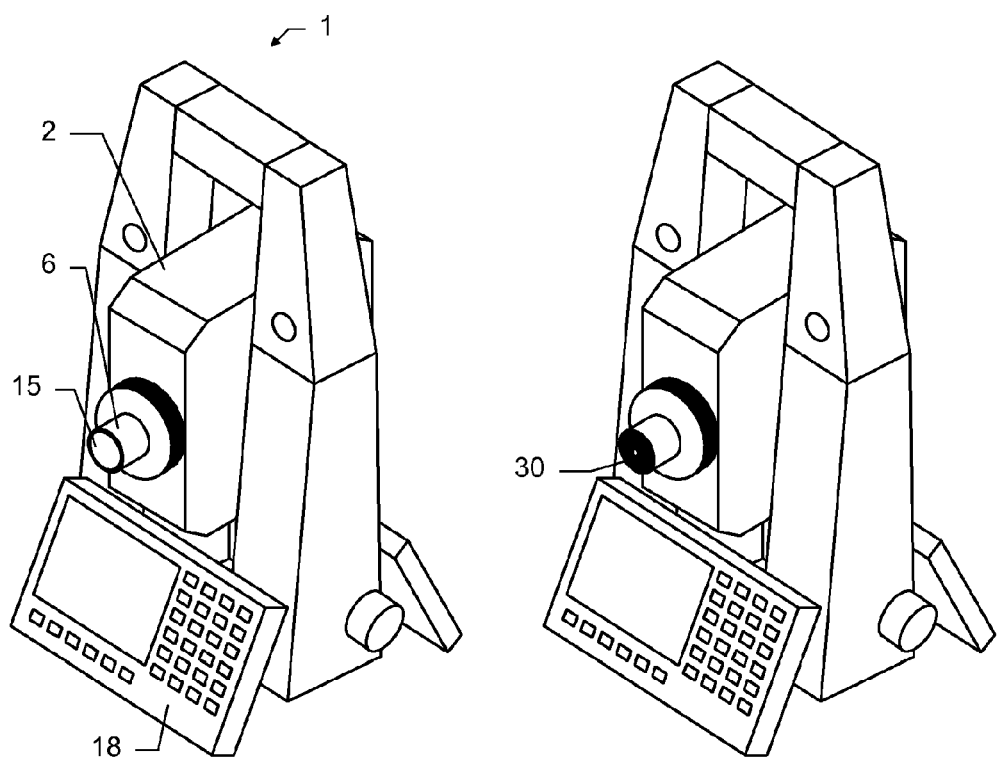
FIG. 6 shows a measuring device according to the invention with a wide pupil aperture of the eyepiece in comparison with a measuring device of the prior art with a direct viewing channel and a small pupil aperture of the eyepiece.

FIG. 6 shows a geodetic measuring device 1 according to the invention with a wide exit pupil 15 of the eyepiece 6 in comparison with a measuring device of the prior art having a direct viewing channel and a very small pupil aperture 30.

The above-described electronic addition of a crosshair during the generation of the display image in the graphics processor affords the advantage, according to the invention, over telescopic sights having a direct viewing channel that it is possible to use an eyepiece 6 having a comparatively large pupil aperture diameter. By contrast, in the case of a visual direct viewing channel with a reticule arranged in an intermediate image plane, the aperture of the pupil 30 of the eyepiece has to be chosen to be very small, in order to keep down a parallax error between reticule and intermediate image when a user looks into the eyepiece obliquely. This problem is caused by the superimposition of a virtual image plane, namely the intermediate image plane, with a real image plane, namely the reticule.

In contrast thereto, the invention, without increasing the risk of such a parallax error, permits the use off an eyepiece 6 having a comparatively large pupil aperture 15, since an image of the field of view region is generated together with the crosshair jointly in one plane—namely in particular the plane of the screen of the microdisplay. For the user, this affords the advantage that a small exit pupil having a disturbing effect in the eyepiece is not necessary and the target object can be targeted with the aid of the sighting device 2 with greater convenience and in a more relaxed fashion. Moreover, viewing the display image through the eyepiece, on account of the wide pupil aperture ensured, is suitable in an improved manner also for users who wear spectacles.

Figure 7:
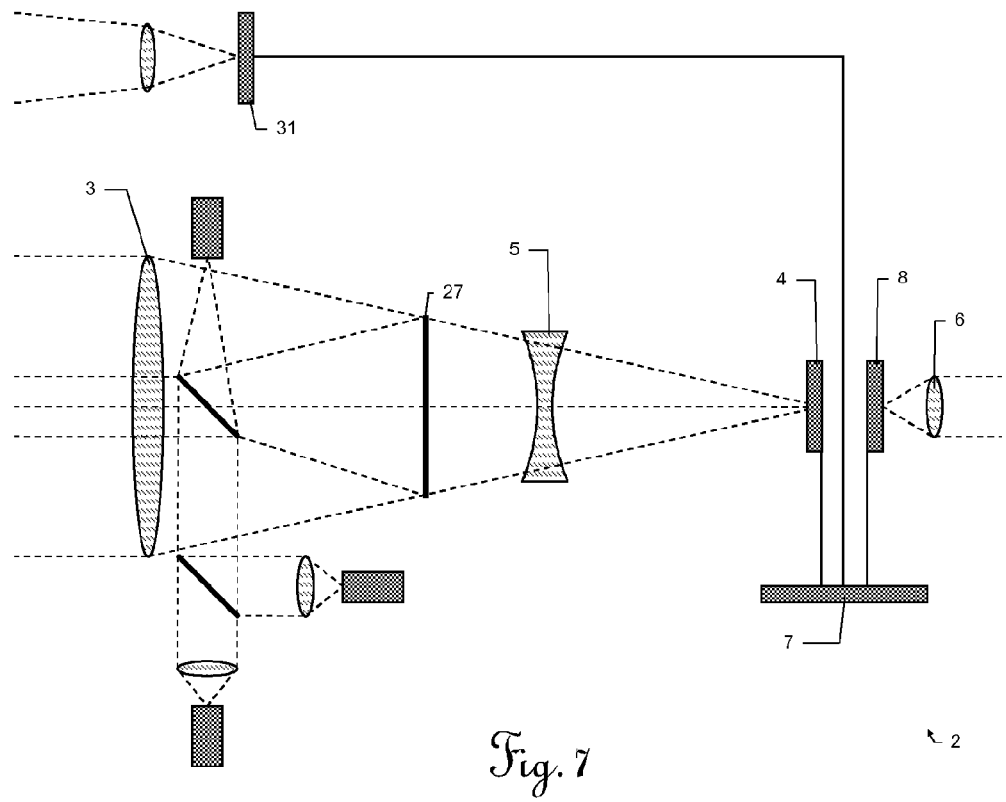
FIG. 7 shows a fourth embodiment for a sighting device optical device according to the invention with a microdisplay disposed upstream of the eyepiece.

FIG. 7 shows a fourth embodiment for a sighting device according to the invention. In this case, in addition to the camera sensor 4 disposed downstream of the objective 3 having a multiply magnifying effect, a further, separate overview camera 31 aligned for example parallel to the optical axis of the sighting device optical system is provided, which camera can be arranged on the sighting device housing. In this case, the overview camera 31 is designed for detecting a wide-angle image in a—compared with the field of view of the camera sensor 4—large wide-angle field of view. The wide-angle image with a large field of view that is detected by means of said overview camera 31 can be represented as a display image on the microdisplay 8 e.g. at the beginning of a finding process. After the target object has been found, the observer can change to the image of the camera sensor 4 disposed downstream of the objective 3 having a multiple magnifying effect, for targeting purposes. In this way it is possible—with continuous viewing of the same microdisplay through the eyepiece—for a target object both to be found in a simple manner and to be sighted precisely.

Figure 8:
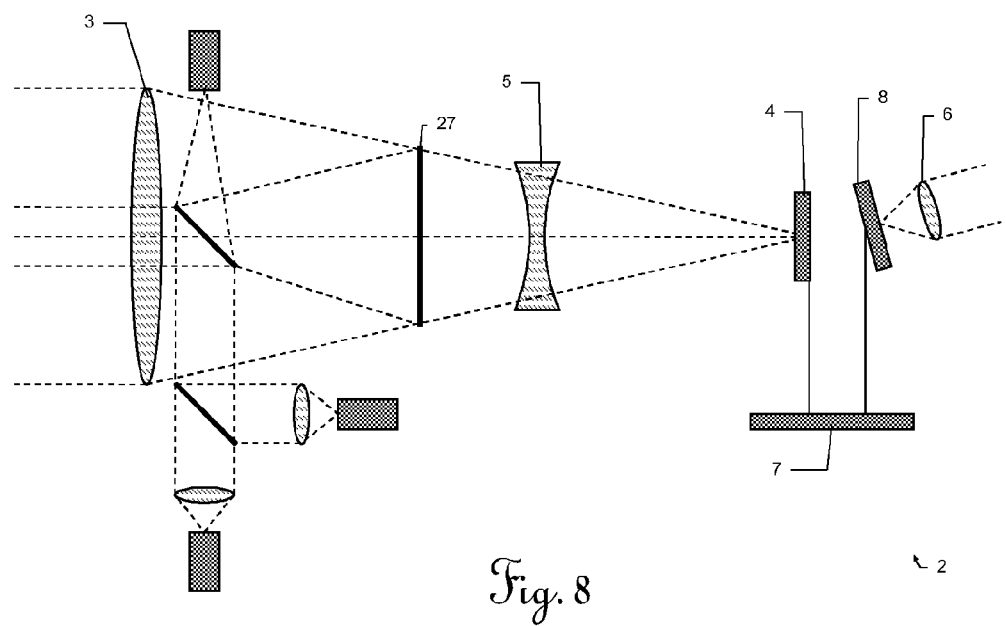
FIG. 8 shows a fifth embodiment for a sighting device optical device according to the invention with a microdisplay disposed upstream of the eyepiece.

FIG. 8 shows a fifth embodiment for a sighting device according to the invention. In this exemplary embodiment, the microdisplay and the eyepiece are arranged in such a way that the optical axes of the microdisplay 8, of the objective 3 and of the eyepiece 6 are not aligned coaxially. By way of example, the arrangement illustrated in FIG. 8, wherein microdisplay 8 and eyepiece 6 are oriented slightly obliquely upward—in relation to the optical axis of the objective 3—, can make it ergonomically more pleasant and thus easier for a tall user to observe the display image through the eyepiece. However, this manner of arrangement in accordance with FIG. 8 might possibly have an adverse effect on intuitiveness when targeting a target object.

It goes without saying that these illustrated figures only schematically illustrate possible exemplary embodiments. The different approaches can likewise be combined with one another and also with methods from the prior art.

In the context of the present invention, the term "geodetic measuring device" is intended always to be understood to mean, in a generalizing manner, a measuring instrument having devices for measuring or checking data with a spatial reference. In particular, this concerns the measurement of distance and/or direction or angles with respect to a reference or measurement point. Furthermore, however, even further devices, e.g. components for satellite-based position determination (e.g. GPS, GLONASS or GALILEO), can be present, which can be used for supplementary measurements or data recordings.

What is claimed is:

1. A geodetic measuring device designed as a theodolite or total station, comprising:
    an angle and distance measuring functionality for determining a position of a target object;
    a sighting device including:
        an objective having a multiply magnifying effect;
        a camera sensor having a multiplicity of image detection points for detecting a camera image of a field of view;
        a focusing optical system disposed upstream of the camera sensor, wherein a first optical path is defined between the objective and the camera sensor; and an eyepiece; and an electronic graphics processor for generating a display image from the camera image, wherein:

the sighting device has an electronic graphical display component disposed upstream of the eyepiece and serving for the visual representation of the generated display image; and a second optical path separated from the first optical path by the display image is defined between the display component and the eyepiece, in such a way that optical rays incident through the objective are prevented from entering into the eyepiece; and the graphics processor, when generating the display image, carries out the electronic processing step of electronic compensation of a distortion of the camera image;

an electronic distance measuring laser source having a laser beam coupled in the first optical path;

a coupling out unit that couples the laser beam out of the first optical path, wherein the coupling out unit can transmit visible spectrum light and couple out the laser beam from the electronic distance measuring laser; and an electronic distance measuring laser receiver configured to receive the coupled out laser beam.

2. The geodetic measuring device as claimed in claim 1, wherein a demarcation between the first and second optical paths that is opaque to optical rays in the visible range is present.

3. The geodetic measuring device as claimed in claim 1, wherein the optical axes of the display component, of the objective and of the eyepiece are coaxially aligned.

4. The geodetic measuring device as claimed in claim 1, wherein the graphics processor, when generating the display image, carries out at least one of the following electronic processing steps:

electronic insertion of a line pattern and/or of a crosshair;

electronic insertion of measurement information;

compensation of a decrease in brightness in edge regions of the camera image;

compensation of a color cast of the camera image, said color cast being produced by the coating of an optical system situated in the first optical path;

a white balance of the camera image;

compensation of a sequence error of the focusing optical system, and/or compensation of temperature influences acting on the camera image, more particularly wherein for this purpose a temperature sensor is provided in the sighting device and wherein the compensation is effected by calibration of the temperature behavior of the sighting device optical system.

5. The geodetic measuring device as claimed in claim 1, wherein the measuring device has an automatic targeting function with a fine targeting light source, the emitted rays of which can be coupled into the first optical path and can be emitted in the direction of the target object through the objective, wherein rays reflected at the target object are detected in a fine targeting image with the aid of the camera sensor as fine targeting detector and the fine targeting image is evaluated with regard to a fine alignment of the sighting device.

6. The geodetic measuring device as claimed in claim 1, further comprising a microdisplay as the display component, wherein the microdisplay has a display diagonal of approximately between 5 and 25 mm and is designed as:

an organic light-emitting diode display;

a thin-film transistor liquid crystal display; or a liquid crystal on silicon display.

7. The geodetic measuring device as claimed in claim 1, wherein the eyepiece has an exit pupil having a diameter of between 5 and 20 mm.

8. The geodetic measuring device as claimed in claim 1, wherein the sighting device optical system is embodied as a catadioptric system, or a refractive system.

9. The geodetic measuring device as claimed in claim 1, wherein the objective has a greatly distorting optical system, such that a central region of the field of view, said central region being crucial for targeting the target object, can be detected with increased resolution by comparison with the edge regions of the field of view, wherein the resultant distortion of the camera image is compensated for during the generation of the display image effected by the graphics processor.

10. The geodetic measuring device as claimed in claim 1, wherein at least the objective, the focusing optical system, the camera sensor, the display component, the eyepiece form a common sighting device structural unit.

11. The geodetic measuring device as claimed in claim 1, wherein at least the objective, the focusing optical system, the camera sensor, the display component, the eyepiece and the graphics processor form a common sighting device structural unit integrated in a common sighting device housing.

12. The geodetic measuring device as claimed in claim 1, wherein the sighting device is arranged on a support in a manner rotatable about a horizontal tilting axis, wherein at least:

the sighting device;

the support; and an electronic display control unit, which is designed for controlling the measuring device and also for processing, displaying, and storing measurement data, form an upper part of the measuring device said upper part being rotatable about a vertical axis relative to a base.

13. The geodetic measuring device as claimed in claim 1, wherein in addition to the camera sensor a further overview camera aligned with respect to the optical axis of the sighting device optical system is provided, which camera can be arranged on the sighting device housing, for detecting a wide-angle image of a large wide-angle field of view relative to a field of view of the camera sensor.

14. The geodetic measuring device as claimed in claim 1, wherein a wide-angle optical system that can be pivoted into and out of the first optical path is provided in order to extend the field of view of the camera sensor.

15. The geodetic measuring device as claimed in claim 1, wherein the optical axes of the objective and of the eyepiece are coaxial.

16. The geodetic measuring device as claimed in claim 1, comprising the coupling out unit being between a first beam combiner and the focusing optical system.

17. The geodetic measuring device as claimed in claim 16, comprising fine targeting light source having a light beam coupled into the first optical path with the at least one beam combiner.

18. A geodetic measuring device designed as a theodolite or total station, comprising:

an angle and distance measuring functionality for determining a position of a target object;

a sighting device including:

an objective having a multiply magnifying effect;

a camera sensor having a multiplicity of image detection points for detecting a camera image of a field of view;

a focusing optical system disposed upstream of the camera sensor, wherein a first optical path is defined between the objective and the camera sensor; and an eyepiece; and an electronic graphics processor for generating a display image from the camera image, wherein:

the sighting device has an electronic graphical display component disposed upstream of the eyepiece and serving for the visual representation of the generated display image; and a second optical path separated from the first optical path by the display image is defined between the display component and the eyepiece, in such a way that optical rays incident through the objective are prevented from entering into the eyepiece; and the graphics processor, when generating the display image, carries out the electronic processing step of electronic compensation of a distortion of the camera image;

an electronic distance measuring laser source having a laser beam coupled in the first optical path;

a coupling out unit that couples the laser beam out of the first optical path;

an electronic distance measuring laser receiver configured to receive the coupled out laser beam; and an overview camera aligned with the first optical path and providing an image to the display component to facilitate target object location, once target object location is identified, the display component displays an image from the camera sensor.

19. The geodetic measuring device as claimed in claim 18, the overview camera configured for a wide-angle image compared to the camera sensor.

20. A geodetic measuring device designed as a theodolite or total station, comprising:

an angle and distance measuring functionality for determining a position of a target object;

a sighting device including:

an objective having a multiply magnifying effect;

a camera sensor having a multiplicity of image detection points for detecting a camera image of a field of view;

a focusing optical system disposed upstream of the camera sensor, wherein a first optical path is defined between the objective and the camera sensor; and an eyepiece; and an electronic graphics processor for generating a display image from the camera image, wherein:

the sighting device has an electronic graphical display component disposed upstream of the eyepiece and serving for the visual representation of the generated display image; and a second optical path separated from the first optical path by the display image is defined between the display component and the eyepiece, in such a way that optical rays incident through the objective are prevented from entering into the eyepiece, wherein the first optical path and second optical path are oblique; and the graphics processor, when generating the display image, carries out the electronic processing step of electronic compensation of a distortion of the camera image;

an electronic distance measuring laser source having a laser beam coupled in the first optical path;

a coupling out unit that couples the laser beam out of the first optical path, wherein the coupling out unit can transmit visible spectrum light and couple out the laser beam from the electronic distance measuring laser; and an electronic distance measuring laser receiver configured to receive the coupled out laser beam.

* * * * *